April 26, 1938.   P. D. MERRILL   2,115,670
PIPE JOINT SEALING DEVICE
Filed July 31, 1935
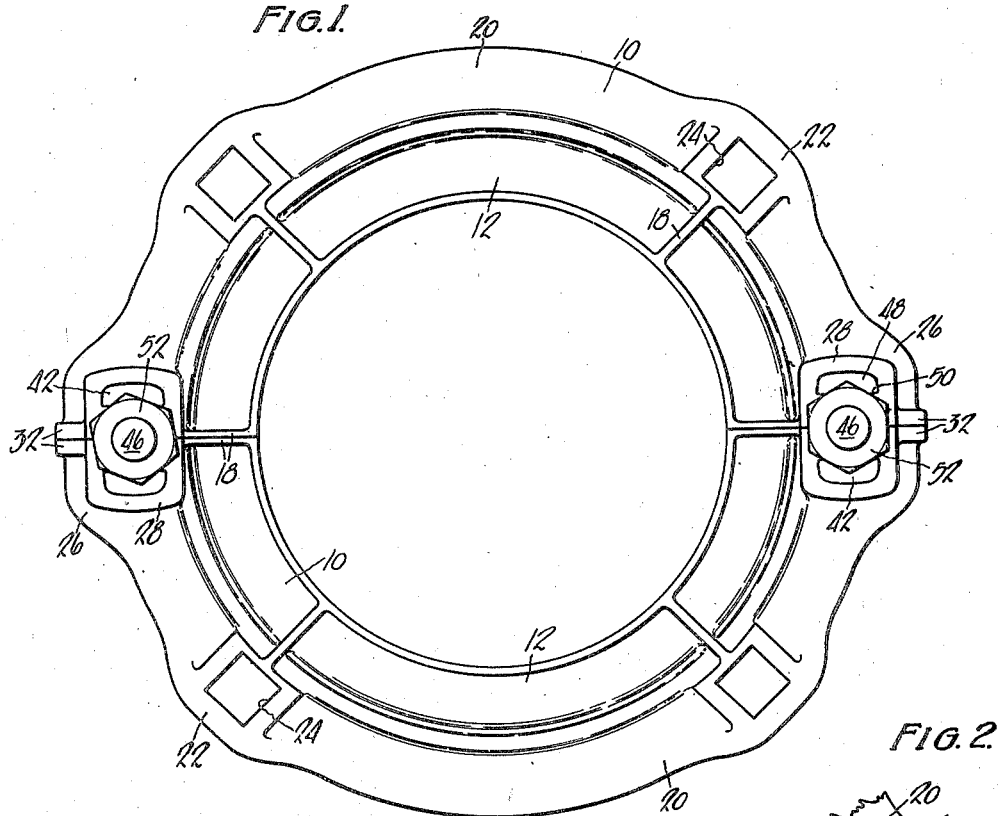
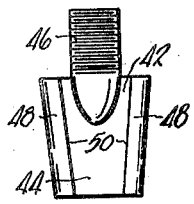
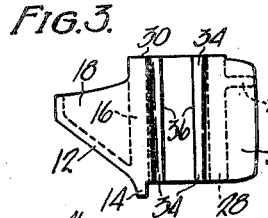
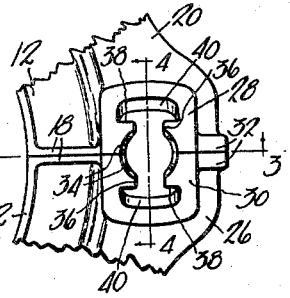
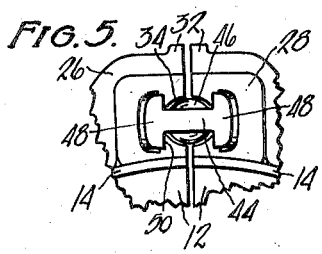
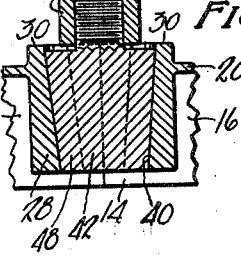
INVENTOR.
PATTERSON D. MERRILL.
BY *Ottoch & Knoblock*
ATTORNEY.

Patented Apr. 26, 1938

2,115,670

UNITED STATES PATENT OFFICE 2,115,670

PIPE JOINT SEALING DEVICE

Patterson D. Merrill, South Bend, Ind., assignor to M. B. Skinner Co., South Bend, Ind.

Application July 31, 1935, Serial No. 33,987

5 Claims. (Cl. 285—119)

This invention relates to devices for sealing the joints of pipes to prevent leakage. It is designed especially for use in connection with pipes of the "bell and spigot" type in which the enlarged end or bell of one pipe receives therein the spigot end of the adjacent pipe, with packing between the overlapped and interfitting portions of the pipes. Devices of this character generally comprise a two-part anchor ring mounted on and positioned by the bell portion or member of the joint, and a two-part follower ring encircling the spigot portion adjacent the joint and drawn longitudinally of the pipe to press a sealing element against the end face of the bell portion. This invention relates particularly to the follower ring construction.

The primary object of this invention is to provide a two-part follower ring construction with means for interconnecting the parts thereof positioned in closely spaced relation to the face of the ring engaging the sealing element.

A further object is to provide a novel ring part interconnecting member having a large ring-part-engaging area for effectively holding the parts together.

A further object is to provide a two-part ring of this character with means for interconnecting the parts to positively align the same in coplanar relation.

A further object is to provide a connector for a two-part ring of this character adapted to extend parallel to the axis of the ring and provided with converging faces bearing on the ring parts to draw the latter together when the connector is applied thereto.

Other objects will be apparent from the description and the appended claims.

In the drawing:

Figure 1 is a view of the ring in side elevation.

Figure 2 is a fragmentary side view illustrating cooperating ends of the ring parts without the connector.

Figure 3 is an end view of one of the ring parts viewed on line 3—3 of Figure 2.

Figure 4 is a fragmentary sectional view taken on line 4—4 of Figure 2.

Figure 5 is a fragmentary side view of the side of the ring opposite that shown in Figures 1 and 2, illustrating a connector partly applied thereto.

Figure 6 is a view of the connector in side elevation.

Referring to the drawing, which illustrates the preferred embodiment of the invention, the numeral 10 designates the follower ring of a sealing device of the type illustrated in Patent No. 1,994,527, issued March 19, 1935, for a "bell and spigot" pipe joint. The ring 10 comprises two semi-circular parts adapted to be secured together at their ends in coplanar relation and each having an inner wall 12 of frusto-conical shape whose inner surface provides a face for engaging and pressing against a rubber or other suitable sealing element (not shown), there being provided integral with said wall a flange 14 adapted to partially overlie such sealing element. Flange 14 forms a continuation of a substantially cylindrical outer wall 16 formed integrally with wall 12 at the outer part thereof whereby said ring is substantially V-shaped in cross section. A plurality of spaced radial webs or ribs 18 span said walls to reinforce the same, one of said webs being positioned at each end of each ring part to provide a part of the end bearing faces of said ring parts. A flange 20 is integrally formed with and extends outwardly from the wall 16 in substantially coplanar relation in the inner edge of wall 12, said flange being provided with spaced enlarged portions 22 having draw bolt receiving openings 24 therein, and enlargements 26 formed at the ends of each ring part. A boss 28 is formed at each end of each ring part integral with and projecting outwardly from wall 16 and laterally from flange 20, said bosses terminating at one side in spaced relation to the outer edge of flange 14 and projecting a substantial distance beyond flange 20 at the opposite side thereof to provide guide or bearing faces 30 off-set from flange 20. A reinforcing flange 32 projects outwardly of the boss 28 at each end of each ring part perpendicularly of flange part 26. By this ring construction, each ring part is provided with end faces of large area formed by web 18, boss 28 and flange 32.

A configured guide or key way is formed in each boss 28 to extend in a direction parallel to the axis of the ring, said guide way comprising tapering curved walls 34, the axis of curvature of which lies in the plane of the end face of the ring part, spaced parallel walls 36 perpendicular to the end face of the ring part, aligned outwardly directed walls 38 lying in a plane inclined to the end face of the ring part in the direction of the side thereof carrying flange 14, and a curved end wall 40 inclined in the same direction. When the ends of the ring parts are positioned in contacting engagement, the guide ways thereof register and provide an I-shaped guide opening having a central circular enlarged portion, the walls thereof tapering in relation to each other.

A connector 42 serves to secure the parts together, and comprises a central plate portion 44 from the center of one end of which projects an integral enlarged threaded part or stem 46 whose axis is an extension of the longitudinal center line of plate 44. Laterally projecting from the opposite faces of plate 44 at each side thereof are elongated guides 48 whose inner faces 50 are aligned, the faces at opposite sides of the connector lying in converging planes equiangular to the axis of portion 46, the spacing of said enlargements being greater at the end of the member from which portion 46 projects.

In connecting the ring parts, the ends thereof are brought into adjacent registering relation, and the connectors 42 are inserted in the guide ways of the bosses 28 from the end thereof adjacent flange 14 as illustrated in Figure 5 with the extension 46 thereof foremost. The faces 50 of the connectors bear upon the faces 38 of the guide ways of the opposite ring parts, the inclination of which faces 50 and 38 relative to the axis of said connector and guide ways, respectively, is identical and equal. The enlarged stem 46 of connector 42 is accommodated by the central tapering portion of the guide way provided by the transversely curved walls 34. The connector 42 is forced into the guide ways toward the position illustrated in Figure 4, the movement thereof to which position, through the cooperating faces 38 and 50 of the ring parts and connector, respectively, serving to draw the ends of the ring parts into abutting or engaging relation. The spacing of the faces 38 from the end faces of the ring parts at the side thereof defined by guide faces 30 is preferably less than one-half the maximum spacing of faces 50 of the connectors, whereby said connectors assume the position illustrated in Figure 4 with the end thereof from which stem 46 projects terminating inwardly of face 30. A nut 52 is threaded on stem 46 of each connector and is brought into face contacting engagement with guide faces 30 of the bosses 28 of the ring parts to lock said faces 30, and the similar or complementary portions of each ring part, in true coplanar or complementary relation. The resultant ring structure is thus absolutely true, so that all circumferential parts of the walls 12 engaging the sealing element have identical relation with all remaining parts of the ring. In this way, where equal stress is applied to all parts of the follower ring by the draw bolts, walls 12 apply equal compression to the sealing element at all circumferential points thereof to provide a uniform tight seal.

Another of the outstanding advantages of this ring construction obtained by the use of this type of connector for securing together the ring parts is the maintaining of the full extent of the end faces of the ring parts in contacting engagement. This is provided by virtue of the following features of the construction: The large area face contacting engagement of the faces 50 of the connector with the faces 38 of the ring parts for substantially the full width of the ring; the double engagement of said connectors with said ring parts at different radii of the ring, i. e. at opposite sides of the central plate 44 of the connector; and the close spacing of the connectors to the walls 12 of the ring which tends to act more effectively upon said walls to minimize separation of the ends of said walls during the application thereby of compressive stresses to the sealing element, so that said walls 12 provide a continuous surface for engaging the sealing element. Another advantage of this construction is the great strength and rigidity of the ring part connection as compared with the conventional bolted flange type of ring part connection.

I claim:—

1. In a pipe joint sealing device the combination with a pair of complementary ring parts having a substantially conical inner wall and a substantially cylindrical outer wall, an enlargement formed integrally with said outer wall at each end of each part and having an opening extending from side to side thereof and open at the end of said part to define a shoulder spaced from and in angular relation to the end face of each part and to the complementary shoulder of the adjacent part, said shoulders being positioned adjacent to the outer end of said inner wall, of a connector fitting in openings of adjacent parts and having tapered bearing surfaces engaging said shoulders for the full width of the ring and adjacent to said inner wall to draw said ring parts into end contacting engagement, and means for locking said connector in said openings.

2. In a pipe joint sealing device, the combination with a pair of arcuate ring parts having inner and outer walls, said inner walls being substantially conical for engagement with a gasket, said outer walls having enlarged ends each provided with a groove extending transversely therethrough and having a restricted mouth opening to the end face of said part to provide a pair of radially spaced aligned shoulders inclined to the end face of said part, the inner of said shoulders terminating adjacent the large diameter end of said inner wall of a connector mounted in the grooves of adjacent ends of said parts, said connector being of I-section to provide aligned bearing faces at each side thereof for engagement with said shoulders, said bearing faces tapering longitudinally of said connector to draw said parts into end engagement, and means for locking said connector in said grooves with said inner walls in coplanar relation to provide a continuous conical gasket engaging face.

3. In a pipe joint sealing device, the combination with a pair of ring parts having inclined inner walls and end portions with end faces and side guide faces, the complementary faces of each ring part having identical relation to the inner wall thereof, said end portions having grooves extending transversely therethrough and each including a restricted mouth opening to said end face to provide a shoulder, of a connector mounted in said grooves and comprising a body portion provided with off-sets having bearing faces lying in converging planes and each having face contacting engagement with one of said shoulders, a threaded stem projecting longitudinally centrally of said body at the large dimension end thereof, and a member threaded on said stem for drawing said connector into said grooves to draw said ring parts into end face contact, said member having face contacting engagement with the guide faces of adjacent ring parts to position said parts in coplanar relation with said inner walls precisely centered to form a continuous conical inner ring wall.

4. In a pipe joint sealing device, the combination with a pair of ring parts each having a comparatively thin tapered inner gasket-engaging wall portion and enlarged ends substantially coextensive with the width of said ring, said ends having radial faces extending outwardly from the inner ring edge and configured transverse grooves inclined relative to and interrupting said faces adjacent the large dimension edge of said inner wall portion, of a tapered configured connector mounted in complementary grooves of adjacent ring ends to secure said ring parts together with said inner walls in precise concentric relation and with the edges thereof in coplanar relation, said end faces having full face engagement to equalize throughout the full width of said inner wall the separating and disaligning stresses applied thereto.

5. In a pipe joint sealing device, the combination with a pair of complementary ring parts of V-section each having a tapered inner wall and an integral outer wall, a flange integral with and spanning said walls at each end thereof, an integral enlargement projecting from said outer walls at each end of each ring part, said flanges and enlargements defining the parting faces of said ring parts, said enlargement having a guide face perpendicular to said parting face, each enlargement having a T-shaped groove therein adjacent said outer wall to provide shoulders spaced from and extending angularly of said parting face and aligned radially of said ring, of a tapered connector of I-section seating in the grooves of adjacent ring parts against said shoulders and shiftable parallel to the ring axis to draw the parting faces of adjacent ring parts into full engagement, and means cooperating with each connector and seating on the guide faces of adjacent ring parts to position the parting faces in precise registering relation, whereby the inner walls of the assembled ring parts form a precise conical surface relative to the ring axis.

PATTERSON D. MERRILL.